United States Patent [19]
Trask et al.

[11] Patent Number: 5,793,406
[45] Date of Patent: Aug. 11, 1998

[54] ADJUSTMENT OF DOT SIZE FOR LASER IMAGERS

[75] Inventors: Jeffrey L. Trask, Boise; Rulon G. Esplin, Eagle; David S. Pitou, Meridian; Richard H. Benear, Boise; James A. Kazakoff, Boise; Brian Hoffmann, Boise, all of Id.

[73] Assignee: Hewlett-Packard Company, Palo Alto, Calif.

[21] Appl. No.: 611,890

[22] Filed: Mar. 6, 1996

[51] Int. Cl.⁶ .................................................. B41J 2/47
[52] U.S. Cl. ...................... 347/252; 395/106; 358/298
[58] Field of Search ............................. 347/247, 251, 347/252, 240, 131; 358/296, 298, 300, 302; 395/106

[56] References Cited

U.S. PATENT DOCUMENTS

| | | |
|---|---|---|
| 5,313,308 | 5/1994 | Hasegawa et al. ................. 358/300 |
| 5,583,644 | 12/1996 | Sasanuma et al. ................. 358/296 |
| 5,666,470 | 9/1997 | Parker ................................ 395/106 |
| 5,671,003 | 9/1997 | Herczeg et al. ................... 347/251 |

*Primary Examiner*—Mark J. Reinhart

[57] ABSTRACT

Fine pulse width modulation (PWM) adjustments in the output of a laser printer are accomplished by receiving values from a bit map and modifying the values in accordance with values in a lookup table (LUT). The lookup table is subdivided into a plurality of blocks, and a selection of the blocks is made in accordance with external values. This allows the output of a pulse width modulation circuit to be adjusted to a precision that is greater than that afforded by the bit size of the values from the bit map. The use of plural blocks in the lookup table permits adjustments in the output of the pulse width modulation circuit in accordance with external factors such as relative humidity, sensitivity of an optical photoreceptor, and developer life.

15 Claims, 4 Drawing Sheets

ADJUSTMENT OF DOT SIZE FOR LASER IMAGERS

FIELD OF THE INVENTION

This invention relates to an electrophotographic image forming apparatus, such as used on laser printers. More particularly, the invention relates to controlling the application of optical or other energy in order to enhance the quality of an image formed on such electrophotographic equipment.

BACKGROUND OF THE INVENTION

In electrophotographic printing, a pattern of electrostatic charges corresponding to a print image is developed on an optical photoreceptor (OPR). Toner is applied to the OPR and that toner that is retained as a result of not being repelled by electrostatic charges is used to form the print image. The print image is then transferred to a print media (usually paper).

The OPR may work with either visible spectrum light or optical energy outside the visible light spectrum. In the preferred embodiment, it is anticipated that near infrared laser light will be used, but the OPR as described in connection with this invention is intended to mean any photoreceptor that responds to radiated energy.

A laser printer such as the assignee's HP Color LaserJet™ printer creates a printed image by causing a laser light source to scan across the charged surface of photosensitive material on the OPR in a succession of scan lines. Each scan line is divided into pixel areas and the laser beam is modulated such that selected pixel areas are exposed to light. The exposure to light results in the depletion of surface charges. The exposure of the OPR to the light thereby discharges the OPR at that location and results in the OPR developing toner. This then results in transfer of the toner to a corresponding location on the print media (usually a sheet of paper).

The toner transferred onto the sheet media appears in a pattern of dots, with each dot corresponding to a pixel. While dots are usually associated with the image on the sheet media and pixels are usually associated with the corresponding electronic image, the one-to-one correspondence of dots to pixels allows the terms to be used interchangeably.

The OPR is usually a continuous surface such as a drum or belt, and is used repeatedly for sequential print operations. The toner applied to the OPR during each print operation and developed in the pattern of the print image, before transfer of the print image from the OPR.

At locations where the OPR charge is depleted (by the laser light), toner particles are concentrated, thereby creating the image. At locations on the OPR that are charged, toner particles are not retained by the OPR (the non-image area). This makes the laser printer particularly adaptable to a rasterized print pattern, although it is possible to configure a laser printer for other types of scan techniques.

In a typical laser printer application, the optical output from the laser is reflected by a rotating mirror, through a lens, against a stationary mirror, and then onto the OPR. The rotating mirror causes the light to be directed across the width of the OPR, so that the image is scanned onto the OPR.

The scan across the width of the OPR results in a line trace across the OPR, which is conventionally referred to as the horizontal direction, and the rotation of the OPR results in movement of the image about the circumference of the roller, which is conventionally referred to as the vertical direction. (In practice, the scan line is slightly skewed from parallel to the axis of the OPR, which synchronizes the scan with the rotational movement of the OPR to effect a horizontal line trace.)

This scanned image is generated in pixel dots, which provides high resolution for various images, such as text, line drawings and graphics. Halftone images are accomplished by depleting a selected percentage of pixels. The use of a pixelated image permits the generation of a high definition image with high predictability.

There are cases where isolated pixels are developed. This occurs mostly when "halftone" images are produced. Halftone images are used to produce light shades of grey or another color and typically consist of development of a selected proportion of pixels in a given area. In other words, one pixel is developed (by depleting the charge of the OPR), while adjacent pixels are not developed (by not depleting the charge of the OPR).

In the case of color printers, each of several primary colors must be applied in a manner that results in the combination of colors providing the desired image. In our preferred embodiment, the primary colors consist of yellow, magenta and cyan as true primary colors, and black as the fourth primary color. This set of primary colors is referred to as, "YMCK" (with the "K" representing black).

The primary colors in a printer are typically subtractive colors, meaning that they use absorption to produce the color on the page. The term "subtractive" refers to the fact that the perceived color results from subtracting color from white light. This contrasts with additive colors, such as light energy generated by a CRT. Thus black is achieved by full pigment rather than an absence of pigment. This would be partially changed if the print media were black and white were used as a neutral pigment. The primary colors in printing are formed by developing adjacent dots, rather than being mixed to form a unified pigment.

It is theoretically possible to generate an image including black areas with only true primary colors (YMC) and not black. In practice, this does not work well because a true balance of superimposed colors is difficult to achieve, and the result is a brown image where black is desired. Also, generating black (or nearly black) from true primary colors requires an excessive amount of toner. Regardless, image data is typically provided to the printer in three primary colors, and image processing circuitry in the printer stores the image in the four YMCK primary colors. The process of separating the grey component from a color is called undercolor removal (UCR).

100% UCR means that the maximum amount of grey component is printed from black pixels (or from pixels from another neutral color). When printing an image with light grey components, 100% UCR tends to result in the black pixel dots being visually apparent. Since it is possible to print an image with less than 100% UCR, it is possible to provide an image at lighter grays in which the black pixel dots are proportionally less apparent. Regardless, providing a balanced image at less than 100% UCR requires precise resolution in the true primary colors that are making up the neutral color.

Color images require control of the precise mix of colors as well as control of the intensity of the colors. It is possible to provide lighter shading of images by not developing adjacent pixels, but a better quality image is produced by controlling the size of individual pixels. One technique for accomplishing this is by sub-pixel laser pulse width modulation (PWM). Higher halftoning resolution and more halftone levels can be achieved by sub-pixel laser PWM. PWM permits a single pixel to be developed on an OPR across a varying area on the OPR. Thus, if a particular printer prints at a resolution of 300 dpi (dots per inch; 11.81 dots per mm), then the increments in image intensity are not limited to whole pixels, but can be made in portions of the pixels. This results in more precise color imaging and better control of optical density.

A process of comparing pixels to known pixel patterns is known as Resolution Enhancement™ technology (trademark of Hewlett-Packard Company) and is described in U.S. Pat. No. 4,847,641. Circuitry which implements Resolution Enhancement™ technology is incorporated in the assignee's HP Color LaserJet™ printer, as well as in other LaserJet™ laser printers. Resolution Enhancement™ technology is used effectively for text smoothing. When applied to text and line definition, Resolution Enhancement™ technology provides a visual improvement comparable to doubling the dot resolution of the printer. This technique is described in U.S. Pat. No. 4,847,641, to Charles Chen-Yuan Tung, and commonly assigned. One result of the technique is an ability to change the size of pixels along the edges of diagonal lines in order to reduce the jagged edges of these lines.

A particular advantage of the techniques described in U.S. Pat. No. 4,847,641 is that the data processing to provide an enhanced image is, "pipelined," meaning that the modification occurs continuously as the image is output to the laser or other image generator. The delay inherent in the additional signal processing is limited to the delay of processing any one group of images, usually one scan line, with five scan lines entered into a buffer. As the image progresses, no additional delay is encountered, since the additional data processing normally does not slow the rate at which data is read from the bit map or transmitted to the image generator.

At the time of the development of the present invention, a significant factor in the cost of producing a color laser printer is page memory. Typically, an image plane of 3200× 2450 pixels would be provided as a bit map in memory in a pass through mode. This image plane is sufficient to produce a 300 dpi image on "A" or letter size paper (216×279 mm). In this example, using 4 bits per pixel, requires 3.92 Mbytes of memory per color or 15.68 Mbytes for the four YMCK colors. With overhead for such things as page and intermediate objects such as fonts, a larger memory size is necessary. In the preferred embodiment, 20 Mbytes are provided. This pixel resolution can be changed to 6 or 8 bits per pixel by increasing memory size or using data compression.

OPR surface potential and toner development in response to light exposure and toner development in response to OPR surface potential are nonlinear functions. In addition, other factors, such as relative humidity, toner charge, variations in response of OPRs in production, and variations of response of the OPR over the lifetime of the OPR affect imaging.

The electrophotographic process non-linearity can be plotted in terms of line width response and tone response. Typical image output responses are represented by FIGS. 1A and 1B. FIG. 1A represents line width change as a function of pulse width (for one pixel), whereas FIG. 1B represents tone response as a function of pulse width. The line width is most critical in text, where precise dimensions are required. Line width response takes into account the proximity of adjacent developed pixels, which results in a partial depletion of areas on the OPR adjacent a developed pixel. Tone response is most critical for color images, where precise color control is desired. This is particularly the case in images that use halftone dots that are typically not adjacent a fully pigmented dot. Therefore, an adjustment in PWM must accommodate the appropriate need of line smoothing or tone adjustment.

If the pulse width range were divided into 15 equal steps (corresponding to 4 bits of data), there would be insufficient resolution in small pulse widths to linearize the electrophotographic process. By linearizing the electrophotographic process, it is intended that a color or grey scale value in an electronic image provided to an electrophotographic printer should bear a linear relationship to the printed image. This would result in a nonlinear conversion from 4 bit gray level to pulse width. These curves are provided as a means of explanation and are not intended to depict actual plotted experimental data.

By controlling the imaging process, image stability is enhanced. This means that the printing of an image can have predictable results, regardless of the effect of variables that tend to affect the operation of the printer.

It is an object of the invention to provide more precise color imaging of a printed image on an electrophotographic printer such as a laser printer. It is a further object to increase resolution electronically and provide more precise color imaging in a laser printer by controlling the energy applied by the image generator. It is a further object to increase resolution and provide more precise color imaging without a corresponding increase in memory requirements for storing a bit mapped image in a laser printer. It is a further object to increase resolution electronically by controlling the energy applied by the image generator.

It is an object to provide a color electrophotographic printer that converts a bit mapped image into a printed image with an incremental halftone capability. In doing so, it is desired to provide for accurate adjustments in tone density, particularly in halftone images, as well as accurate adjustments in line size.

In achieving these objects, it is desired to make fine adjustments in pulse width output to an image generator such as a laser diode. In making the fine adjustments, it is desired to provide an adjustment of resolution that allows the use of a pattern that provides an image that has more precise color imaging and better control of optical density for a given dot resolution.

It is possible to control optical output as affected by external colors by sensing prior color images, for example in a test cycle. The image is sensed and adjustments are then made in response to this sensed information. This technique is referred to as feedback. It is an object to achieve more precise color imaging and better control of optical density without sensing prior images, i.e., in a no-feedback system.

SUMMARY OF THE INVENTION

This invention is intended to provide a more uniform print image with printers that use a pixelated image, and in order to improve the resolution, more precise color imaging and better control of optical density. An image that is modified to provide improved resolution at an output signal is further modified in order to provide a pulse width modulation (PWM) of an output signal. The further modification provides a linear tone response for primary colors, such as YMCK primary colors (yellow, magenta, cyan, black), with a maximum number of usable tone levels. The further modification of the output signal results in a minimum of tone differences between printers and minimizes change in tone over developer life and relative humidity.

The invention provides an ability to control pulse width to compensate for these changes without an increase in memory required for storing the pixelated image. This allows information for each page to be placed in a memory having a size corresponding to a given image plane. The storage corresponds to a bit map with a given number of bits per pixel, plus memory overhead for other functions. The memory size for a given page resolution therefore does not need to account for the further modification. The ability to control PWM allows an increase in the number of levels of optical density of each pixel.

In a further aspect of the invention, the resolution of PWM is increased without a corresponding increase in bit map memory. This allows the provision of PWM data at an increased resolution. Typically, the increase in PWM data would be from 4 bit resolution to 6 bit or 8 bit resolution.

The increased resolution of pulse width is used to provide a PWM output that is adjusted for line width smoothing and tone. Also, as a result of the increased resolution, it is possible to achieve PWM levels that are a suitable compromise between PWM needed for line smoothing and PWM needed for tone adjustment. If the PWM can be controlled more precisely, it is possible to use a single compromise adjustment for both line width and tone. The compromise adjustment implies deviation from the desired adjustment for line width and tone. The increased precision in PWM adjustment is able to reduce further deviation from the ideal PWM for either adjustment criteria. Restated, if the compromise adjustment deviates from ideal adjustment for either line width or tone, the higher resolution for effecting that adjustment prevents that deviation from further increasing.

Thus, a compromise is chosen between the ideal PWM adjustment for line width and tone. The PWM is established by use of a lookup table (LUT). Values are provided by an image processor for each of a plurality of primary colors. These values are then used to select output values from the lookup table.

The lookup table is divided into sections, with each section of the lookup table being selected in response to one or more external factors. In the preferred embodiment, these external factors include developer life, as represented by cycle count, relative humidity and a photosensitivity value of the particular optical photoreceptor (OPR) as provided by the manufacturer.

When an image to be printed is received, an image processor provides signals to be stored in a bit map as a printer bit mapped image. The printer bit mapped image corresponds to formatting criteria for printing, such as text smoothing, UCR conversion (directed to the black component), color conversion to yellow, magenta and cyan (YMC) primaries with color tables, and halftoning. The printer bit mapped image is stored as a separate bit map for each of the YMCK primaries. The printer bit mapped image is provided as signals to a lookup table in a sequence for output scanning. Values from the lookup table corresponding to the printer bit mapped image signals are output as modified signals to output driver circuitry, which in turn drives an output device such as a laser diode.

The lookup table includes a plurality of sections. The values of the modified signals from the lookup table are varied according to a selection of the section of the lookup table. A selector circuit receives modification signals, which in the preferred embodiment include external signals related to developer life, humidity and a manufacturer's rating for the OPR. The selector circuit then selects the section of the lookup table to be used for providing the modified signals from the lookup table.

The lookup table thereby provides an adjustment in response to the external signals. In addition, the lookup table provides a response to the image data generated by the image processor in which the output has a finer resolution as a result of comparison to the data provided in the lookup table. The finer resolution is accomplished without requiring that the finer resolution be stored in a bit mapped memory.

In order to accommodate the use of the different YMCK primary colors, the selection of the sections of the lookup table is made for each color. This accommodates differences between the different colors, such as, for example, developer life. There are cases in which a monochrome image is produced with a color printer, and only one of the YMCK primary colors (typically black) is used, and the developers for the remaining colors (YMC) are not cycled.

When adjusting PWM, this adjustment had been achieved by adjusting pulse position between left, right and center. This position adjustment can be accomplished using 2 bits of data. When adding exposure to an adjacent pixel, left/right control provides more linear transitions, but does not enhance stability. Such position control would reduce an ability to adjust gray levels (in all YMCK primary colors), typically from $15(2^4-1)$ to $3(2^2-1)$. This would reduce resolution in controlling energy levels, particularly for controlling tone levels. In order to overcome this reduction in resolution, PWM adjustment in position may be eliminated. Optionally, PWM adjustment in left, right and center position may be provided for black pigment, while eliminating PWM positional adjustment for true primary colors (yellow, magenta and cyan).

The lookup table provides the requisite information that is used to accomplish the adjustment in PWM. As a result of the higher resolution in number of bits, the PWM adjustment is in smaller increments than would be possible by only processing image data information from the bit map without the external signals. The higher resolution in the modified output data as compared to the data provided as signals to the lookup table allows control of the output driver circuitry to a finer degree than would otherwise be achieved in response to the number of bits per pixel obtained from the printer bit map. This results in a higher resolution of adjustment in the output to the output driver circuitry, even without the use of the external factors.

The higher resolution of the modified output data allows provides for accurate adjustments in tone density, particularly in halftone images. This has the further advantage of permitting more faithful reproduction of images with a light grey component when reduced UCR conversion is used for these images. Since the external factors are taken into account prior to producing the image, it is possible to obtain more precise color imaging and better control of optical density in a no-feedback system.

BRIEF DESCRIPTION OF THE DRAWINGS

FIG. 1A shows the effect on line width and FIG. 1B shows the effect on tone response;

DETAILED DESCRIPTION OF THE PREFERRED EMBODIMENTS

Figure 2:
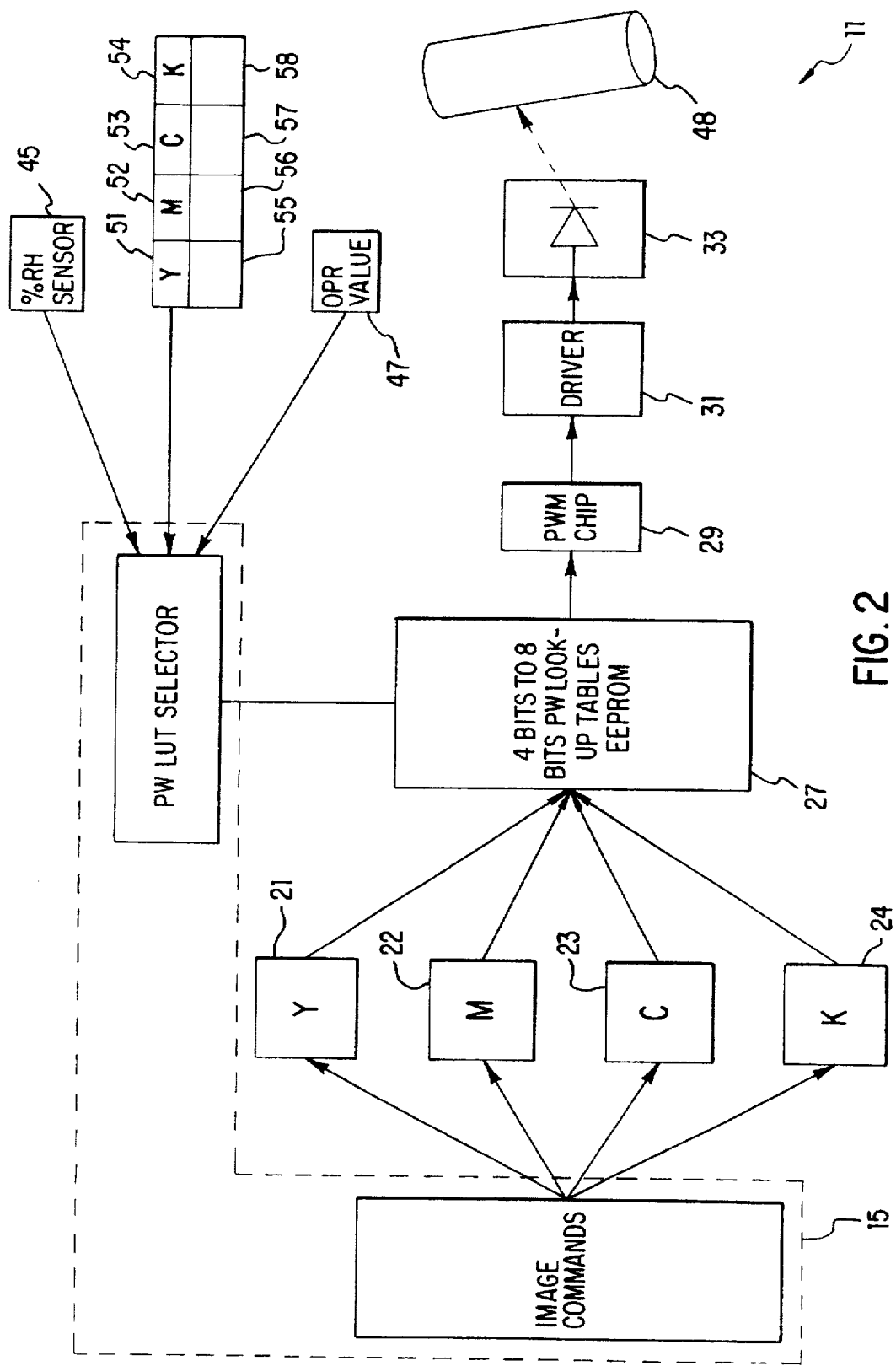
FIG. 2 is a block diagram of a circuit for adjusting an image signal in response to detected conditions.
Figure 3:
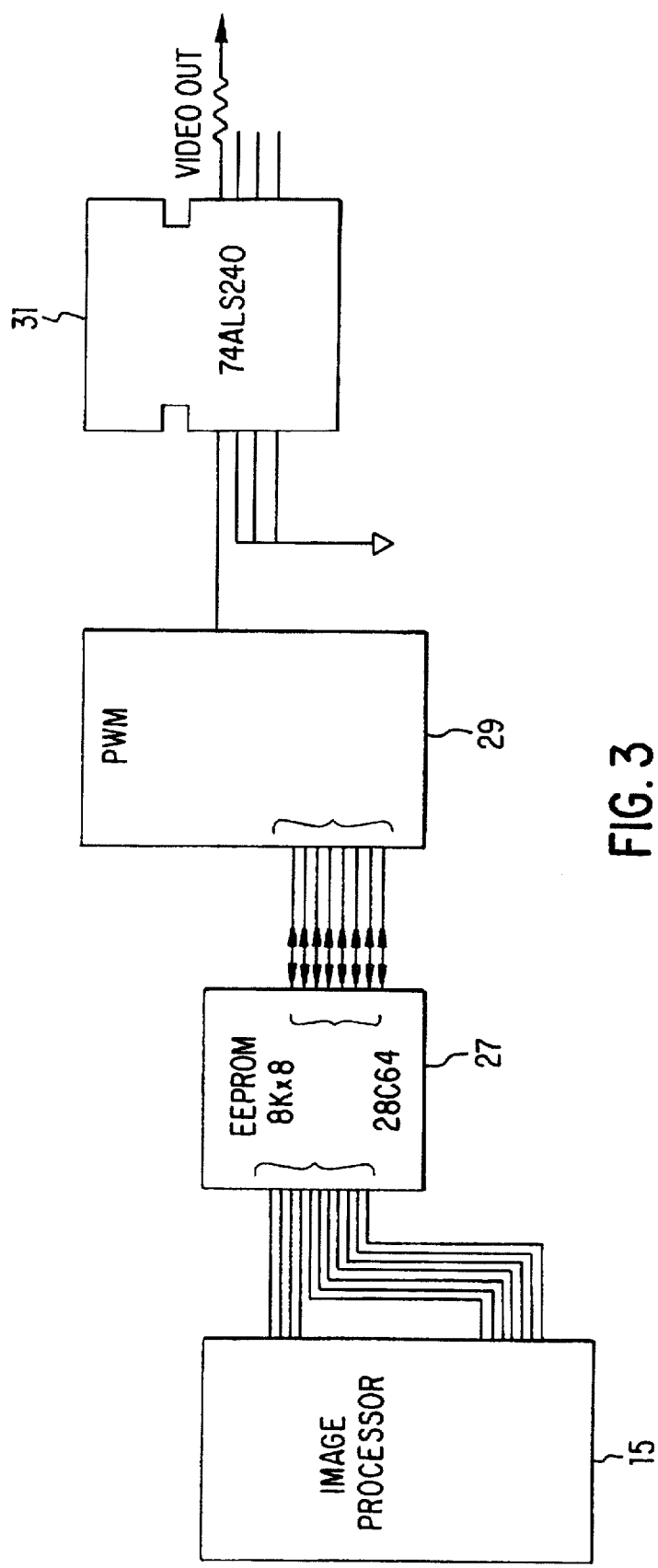
FIG. 3 is a circuit diagram of a circuit of FIG. 2.

FIGS. 2 and 3 show an implementation of the invention when used in connection with a laser printer 11, according to a preferred embodiment. An image is received by an image processor 15. The image processor 15 converts the image to bit mapped color image signals that correspond to a set of YMCK primary colors, which include yellow, magenta and cyan as true primary colors and black (K) as a neutral color. The bit mapped color image signals are stored in a plurality of memory stores 21-24 as bit maps. The conversion to YMCK primary colors allows the selection of primary colors suitable for laser printing, and UCR conversion. The color image signals are stored in the color image memory stores 21-24 that correspond to respective ones of the YMCK colors.

The data from the YMCK memory stores 21-24 are provided to a lookup table (LUT) 27, where the data is modified in accordance with values stored in the lookup table 27. The lookup table 27 then provides signals corresponding to the modified values to a pulse width modulation (PWM) circuit 29 that in turn provides a signal to a laser diode driver circuit 31 for illuminating a laser diode 33.

The lookup table 27 is treated for addressing purposes as having 128 rows of 16 byte (four words), for a total of 16k bytes. The rows are identified by the numerals r0–r127. The 16 bytes, represented by hexadecimal notation (0–f, corresponding to 0–15$_{10}$) are treated for addressing purposes as columns. By rows, we are referring to a group of 16 bytes that compose four words of data. Array architecture uses the terms "rows" and "columns" to describe addressed bits on a semiconductor array. When we refer to the rows of four words on the lookup table 27, we are referring to groupings of four words, which are not necessarily rows on an EEPROM that is the semiconductor devise used to store the data in the lookup table 27. Therefore, our definition of rows is focused on the groups of four words, rather than the array architecture of the lookup table 27.

The lookup table 27 is divided into a series nine blocks containing 13 rows of four words (16-bytes) each, identified as highlight families 1-9. In addition, the lookup table 27 contains four smaller blocks. The smaller blocks include a block containing one four word row of zeros, a block containing 5 four words rows of average nominal value tables, a block containing 4 four word rows of fine increments for electrophotographic process testing, and a block containing one four word row of linear increments for manufacturing testing. The blocks are provided as follows:

| row | purpose |
|---|---|
| r0: | all zeros, assures no video output signal |
| r1–r5 | average nominal value tables for initial design testing |
| r6–r9 | fine subdivision of 0-255 PWM range for testing |
| r10–r22 | highlight family #1 (smallest highlight pulse width) |
| r23–r35 | highlight family #2 |
| r36–r48 | highlight family #3 |
| r49–r61 | highlight family #4 |
| r62–r74 | highlight family #5 |
| r75–r87 | highlight family #6 |
| r88–r100 | highlight family #7 |
| r101–r113 | highlight family #8 |
| r114–r126 | highlight family #9 (largest highlight pulse width) |
| r127 | linear pulse width curve for manufacturing testing |

During normal operation of the printer 11, the blocks corresponding to rows r0 and r10–r126 are used. Rows r1–r9 and r127 are reserved for various forms of testing. As a result of the division of the lookup table 27, ten smaller lookup tables are formed, in addition to the rows reserved for testing. These ten smaller lookup tables are the zero row (r0), which prevents output, and highlight families #1–#9. The zero row (r0) is useful during startup and during extra exposure passes.

The lookup table 27 is preferably embodied as an EEPROM (electrically erasable programmable read only memory), which allows various adjustments in highlight families #1–#9 before and during the production cycle of the preferred embodiment of the printer. The use of the fixed rows, including the zero row r0 and the rows reserved for testing r1–r9 and r127 allows test operation of the printer 11 to be unaffected by changes to highlight families #1–#9. While rows r0, r6–r9 and r127 by their nature remain constant, r1–r5 are specifically provided as a fixed sample.

The logical arrangement of the lookup table 27 is as follows. Each numbered block represents a value stored in an eight-bit byte. Unused memory is not shown:

| row no. | (column no., hexadecimal) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| r0 | 00 | 00 | 00 | 00 | 00 | 00 | 00 | 00 | 00 | 00 | 00 | 00 | 00 | 00 | 00 | 00 | null |
| r1 | 00 | 0b | 0f | 13 | 18 | 1c | 20 | 25 | 2a | 30 | 37 | 40 | 4d | 5d | 72 | 99 | nominal 60-4 |
| r2 | 00 | 0c | 10 | 15 | 1a | 1e | 23 | 29 | 2e | 35 | 3e | 49 | 58 | 6b | 84 | b3 | nominal 70-4 |
| r3 | 00 | 0c | 11 | 16 | 1b | 20 | 26 | 2b | 32 | 39 | 43 | 50 | 61 | 78 | 95 | cc | nominal 80-4 |
| r4 | 00 | 0d | 12 | 18 | 1d | 23 | 29 | 2f | 36 | 3e | 49 | 58 | 6c | 85 | a7 | e6 | nominal 90-4 |
| r5 | 00 | 0d | 13 | 19 | 1f | 25 | 2b | 32 | 39 | 43 | 4f | 5f | 75 | 92 | b8 | ff | nominal 100-4 |
| r6 | 00 | 0a | 0c | 0e | 10 | 12 | 14 | 16 | 18 | 1a | 1c | 1e | 20 | 22 | 24 | 26 | calibrate #1 |
| r7 | 00 | 28 | 2a | 2c | 2e | 32 | 36 | 3a | 3e | 42 | 46 | 4a | 4e | 52 | 56 | 5a | calibrate #2 |
| r8 | 00 | 5e | 62 | 66 | 6a | 6e | 72 | 76 | 7a | 7e | 82 | 88 | 8e | 94 | 9a | a0 | calibrate #3 |
| r9 | 00 | a6 | ac | b2 | b8 | be | c4 | ca | d0 | d6 | dc | e2 | e8 | ee | f4 | ff | calibrate #4 highlight family #1 |
| r10 | 00 | 08 | 0d | 12 | 16 | 1b | 21 | 26 | 2d | 36 | 41 | 52 | 69 | 87 | b1 | ff | (full dot pulse width = 100%) |
| r11 | 00 | 08 | 0d | 11 | 16 | 1b | 20 | 26 | 2d | 35 | 40 | 50 | 67 | 84 | ac | f7 | (full dot pulse width = 97%) |
| r12 | 00 | 08 | 0c | 11 | 16 | 1b | 20 | 25 | 2c | 34 | 3f | 4e | 64 | 80 | a6 | ee | (full dot pulse width = 93%) |
| r13 | 00 | 08 | 0c | 11 | 16 | 1a | 1f | 25 | 2b | 33 | 3e | 4d | 61 | 7c | a1 | e6 | (full dot pulse width = 90%) |
| r14 | 00 | 08 | 0c | 11 | 15 | 1a | 1f | 24 | 2a | 32 | 3c | 4a | 5e | 78 | 9b | dd | (full dot pulse width = 87%) |
| r15 | 00 | 08 | 0c | 11 | 15 | 1a | 1f | 24 | 2a | 31 | 3b | 49 | 5c | 75 | 96 | d5 | (full dot pulse width = 83%) |
| r16 | 00 | 07 | 0c | 10 | 15 | 19 | 1e | 23 | 29 | 30 | 3a | 47 | 59 | 71 | 90 | cc | (full dot pulse width = 80%) |
| r17 | 00 | 07 | 0c | 10 | 15 | 19 | 1e | 23 | 29 | 30 | 39 | 45 | 57 | 6d | 8b | c4 | (full dot pulse width = 77%) |
| r18 | 00 | 07 | 0c | 10 | 14 | 19 | 1d | 22 | 28 | 2e | 37 | 43 | 54 | 69 | 86 | bb | (full dot pulse width = 73%) |
| r19 | 00 | 07 | 0c | 10 | 14 | 18 | 1d | 22 | 27 | 2e | 36 | 42 | 52 | 66 | 81 | b3 | (full dot pulse width = 70%) |
| r20 | 00 | 07 | 0b | 10 | 14 | 18 | 1c | 21 | 26 | 2d | 35 | 40 | 4f | 61 | 7b | aa | (full dot pulse width = 67%) |

-continued

| row no. | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| | | | | | | | (column no., hexadecimal) | | | | | | | | | | |
| r21 | 00 | 07 | 0b | 0f | 14 | 18 | 1c | 21 | 26 | 2c | 34 | 3e | 4c | 5e | 76 | a2 | (full dot pulse width = 63%) |
| r22 | 00 | 07 | 0b | 0f | 13 | 17 | 1b | 20 | 25 | 2b | 32 | 3c | 49 | 5a | 70 | 99 | (full dot pulse width = 60%) highlight family #2 |
| r23 | 00 | 0a | 0f | 14 | 19 | 1f | 24 | 2a | 31 | 3a | 45 | 56 | 6d | 8a | b3 | ff | (full dot pulse width = 100%) |
| r24 | 00 | 0a | 0f | 14 | 19 | 1e | 24 | 2a | 31 | 39 | 45 | 54 | 6a | 87 | ae | f7 | (full dot pulse width = 97%) |
| r25 | 00 | 0a | 0f | 14 | 19 | 1e | 23 | 29 | 30 | 38 | 43 | 52 | 67 | 83 | a8 | ee | (full dot pulse width = 93%) |
| r26 | 00 | 0a | 0f | 14 | 19 | 1e | 23 | 29 | 2f | 37 | 42 | 51 | 65 | 7f | a3 | e6 | (full dot pulse width = 90%) |
| r27 | 00 | 0a | 0f | 14 | 18 | 1d | 22 | 28 | 2e | 36 | 40 | 4f | 62 | 7b | 9d | dd | (full dot pulse width = 87%) |
| r28 | 00 | 0a | 0f | 13 | 18 | 1d | 22 | 28 | 2e | 36 | 40 | 4d | 60 | 78 | 98 | d5 | (full dot pulse width = 83%) |
| r29 | 00 | 0a | 0e | 13 | 18 | 1d | 22 | 27 | 2d | 34 | 3e | 4b | 5d | 74 | 92 | cc | (full dot pulse width = 80%) |
| r30 | 00 | 0a | 0e | 13 | 18 | 1c | 21 | 27 | 2d | 34 | 3d | 49 | 5b | 70 | 8e | c4 | (full dot pulse width = 77%) |
| r31 | 00 | 0a | 0e | 13 | 17 | 1c | 21 | 26 | 2c | 33 | 3b | 47 | 58 | 6c | 88 | bb | (full dot pulse width = 73%) |
| r32 | 00 | 0a | 0e | 13 | 17 | 1c | 21 | 26 | 2b | 32 | 3b | 46 | 55 | 69 | 83 | b3 | (full dot pulse width = 70%) |
| r33 | 00 | 09 | 0e | 12 | 17 | 1b | 20 | 25 | 2a | 31 | 39 | 44 | 52 | 65 | 7d | aa | (full dot pulse width = 67%) |
| r34 | 00 | 09 | 0e | 12 | 17 | 1b | 20 | 25 | 2a | 30 | 38 | 42 | 50 | 61 | 78 | a2 | (full dot pulse width = 63%) |
| r35 | 00 | 09 | 0e | 12 | 16 | 1b | 1f | 24 | 29 | 2f | 36 | 40 | 4d | 5d | 72 | 99 | (full dot pulse width = 60%) highlight family #3 |
| r36 | 00 | 0c | 12 | 17 | 1d | 22 | 28 | 2e | 35 | 3e | 4a | 5a | 70 | 8e | b5 | ff | (full dot pulse width = 100%) |
| r37 | 00 | 0c | 12 | 17 | 1c | 22 | 27 | 2e | 35 | 3d | 49 | 58 | 6e | 8a | b0 | f7 | (full dot pulse width = 97%) |
| r38 | 00 | 0c | 11 | 17 | 1c | 21 | 27 | 2d | 34 | 3c | 47 | 56 | 6b | 86 | aa | ee | (full dot pulse width = 93%) |
| r39 | 00 | 0c | 11 | 17 | 1c | 21 | 27 | 2d | 33 | 3c | 46 | 55 | 69 | 83 | a5 | e6 | (full dot pulse width = 90%) |
| r40 | 00 | 0c | 11 | 16 | 1b | 21 | 26 | 2c | 32 | 3a | 45 | 53 | 66 | 7e | 9f | dd | (full dot pulse width = 87%) |
| r41 | 00 | 0c | 11 | 16 | 1b | 20 | 26 | 2c | 32 | 3a | 44 | 51 | 64 | 7b | 9a | d5 | (full dot pulse width = 83%) |
| r42 | 00 | 0c | 11 | 16 | 1b | 20 | 25 | 2b | 31 | 39 | 42 | 4f | 61 | 77 | 95 | cc | (full dot pulse width = 80%) |
| r43 | 00 | 0c | 11 | 16 | 1b | 20 | 25 | 2a | 31 | 38 | 41 | 4e | 5e | 73 | 90 | c4 | (full dot pulse width = 77%) |
| r44 | 00 | 0c | 11 | 16 | 1a | 1f | 24 | 2a | 30 | 37 | 40 | 4b | 5b | 6f | 8a | bb | (full dot pulse width = 73%) |
| r45 | 00 | 0c | 11 | 15 | 1a | 1f | 24 | 29 | 2f | 36 | 3f | 4a | 59 | 6c | 85 | b3 | (full dot pulse width = 70%) |
| r46 | 00 | 0c | 10 | 15 | 1a | 1f | 23 | 29 | 2e | 35 | 3d | 48 | 56 | 68 | 7f | aa | (full dot pulse width = 67%) |
| r47 | 00 | 0c | 10 | 15 | 1a | 1e | 23 | 28 | 2e | 34 | 3c | 46 | 54 | 64 | 7a | a2 | (full dot pulse width = 63%) |
| r48 | 00 | 0c | 10 | 15 | 19 | 1e | 23 | 28 | 2d | 33 | 3b | 44 | 51 | 60 | 74 | 99 | (full dot pulse width = 60%) highlight family #4 |
| r49 | 00 | 0f | 14 | 1a | 20 | 25 | 2b | 32 | 39 | 42 | 4e | 5e | 74 | 91 | b7 | ff | (full dot pulse width = 100%) |
| r50 | 00 | 0f | 14 | 1a | 1f | 25 | 2b | 31 | 39 | 42 | 4d | 5c | 72 | 8d | b2 | f7 | (full dot pulse width = 97%) |
| r51 | 00 | 0f | 14 | 1a | 1f | 25 | 2a | 31 | 38 | 40 | 4b | 5a | 6f | 89 | ac | ee | (full dot pulse width = 93%) |
| r52 | 00 | 0e | 14 | 19 | 1f | 24 | 2a | 30 | 37 | 40 | 4a | 59 | 6d | 86 | a7 | e6 | (full dot pulse width = 90%) |
| r53 | 00 | 0e | 14 | 19 | 1e | 24 | 2a | 30 | 36 | 3f | 49 | 57 | 6a | 81 | a1 | dd | (full dot pulse width = 87%) |
| r54 | 00 | 0e | 14 | 19 | 1e | 24 | 29 | 2f | 36 | 3e | 48 | 55 | 67 | 7e | 9d | d5 | (full dot pulse width = 83%) |
| r55 | 00 | 0e | 13 | 19 | 1e | 23 | 29 | 2f | 35 | 3d | 46 | 53 | 64 | 7a | 97 | cc | (full dot pulse width = 80%) |
| r56 | 00 | 0e | 13 | 19 | 1e | 23 | 29 | 2e | 35 | 3c | 45 | 52 | 62 | 77 | 92 | c4 | (full dot pulse width = 77%) |
| r57 | 00 | 0e | 13 | 18 | 1d | 23 | 28 | 2e | 34 | 3b | 44 | 4f | 5f | 72 | 8c | bb | (full dot pulse width = 73%) |
| r58 | 00 | 0e | 13 | 18 | 1d | 22 | 28 | 2d | 33 | 3a | 43 | 4e | 5d | 6f | 87 | b3 | (full dot pulse width = 70%) |
| r59 | 00 | 0e | 13 | 18 | 1d | 22 | 27 | 2c | 32 | 39 | 41 | 4c | 5a | 6b | 81 | aa | (full dot pulse width = 67%) |
| r60 | 00 | 0e | 13 | 18 | 1d | 22 | 27 | 2c | 32 | 39 | 40 | 4a | 58 | 67 | 7c | a2 | (full dot pulse width = 63%) |
| r61 | 00 | 0e | 13 | 18 | 1c | 21 | 26 | 2b | 31 | 37 | 3f | 48 | 55 | 63 | 76 | 99 | (full dot pulse width = 60%) highlight family #5 |
| r62 | 00 | 11 | 17 | 1d | 23 | 29 | 2f | 36 | 3d | 46 | 52 | 62 | 78 | 94 | b9 | ff | (full dot pulse width = 100%) |
| r63 | 00 | 11 | 17 | 1d | 23 | 28 | 2f | 35 | 3d | 46 | 51 | 61 | 76 | 90 | b4 | f7 | (full dot pulse width = 97%) |
| r64 | 00 | 11 | 17 | 1c | 22 | 28 | 2e | 35 | 3c | 45 | 50 | 5e | 73 | 8c | ae | ee | (full dot pulse width = 93%) |
| r65 | 00 | 11 | 16 | 1c | 22 | 28 | 2e | 34 | 3b | 44 | 4f | 5d | 70 | 89 | a9 | e6 | (full dot pulse width = 90%) |
| r66 | 00 | 11 | 16 | 1c | 22 | 27 | 2d | 33 | 3a | 43 | 4d | 5b | 6d | 85 | a4 | dd | (full dot pulse width = 87%) |
| r67 | 00 | 11 | 16 | 1c | 21 | 27 | 2d | 33 | 3a | 42 | 4c | 59 | 6b | 81 | 9f | d5 | (full dot pulse width = 83%) |
| r68 | 00 | 11 | 16 | 1c | 21 | 27 | 2c | 32 | 39 | 41 | 4b | 57 | 68 | 7d | 99 | cc | (full dot pulse width = 80%) |
| r69 | 00 | 10 | 16 | 1b | 21 | 26 | 2c | 32 | 39 | 40 | 4a | 56 | 66 | 7a | 94 | c4 | (full dot pulse width = 77%) |
| r70 | 00 | 10 | 16 | 1b | 20 | 26 | 2b | 31 | 38 | 3f | 48 | 54 | 63 | 75 | 8e | bb | (full dot pulse width = 73%) |
| r71 | 00 | 10 | 16 | 1b | 20 | 26 | 2b | 31 | 37 | 3f | 47 | 52 | 61 | 72 | 89 | b3 | (full dot pulse width = 70%) |
| r72 | 00 | 10 | 15 | 1b | 20 | 25 | 2b | 30 | 36 | 3d | 46 | 50 | 5e | 6e | 83 | aa | (full dot pulse width = 67%) |
| r73 | 00 | 10 | 15 | 1b | 20 | 25 | 2a | 30 | 36 | 3d | 45 | 4f | 5b | 6b | 7e | a2 | (full dot pulse width = 63%) |
| r74 | 00 | 10 | 15 | 1a | 1f | 25 | 2a | 2f | 35 | 3c | 43 | 4c | 58 | 66 | 78 | 99 | (full dot pulse width = 60%) highlight family #6 |
| r75 | 00 | 13 | 19 | 20 | 26 | 2c | 32 | 39 | 41 | 4a | 56 | 66 | 7c | 97 | bb | ff | (full dot pulse width = 100%) |
| r76 | 00 | 13 | 19 | 1f | 26 | 2c | 32 | 39 | 41 | 4a | 55 | 65 | 79 | 93 | b6 | f7 | (full dot pulse width = 97%) |
| r77 | 00 | 13 | 19 | 1f | 25 | 2b | 32 | 38 | 40 | 49 | 54 | 62 | 76 | 8f | b0 | ee | (full dot pulse width = 93%) |
| r78 | 00 | 13 | 19 | 1f | 25 | 2b | 31 | 38 | 3f | 48 | 53 | 61 | 74 | 8c | ac | e6 | (full dot pulse width = 90%) |
| r79 | 00 | 13 | 19 | 1f | 25 | 2b | 31 | 37 | 3e | 47 | 51 | 5f | 71 | 88 | a6 | dd | (full dot pulse width = 87%) |
| r80 | 00 | 13 | 19 | 1f | 24 | 2a | 31 | 37 | 3e | 46 | 50 | 5d | 6f | 84 | a1 | d5 | (full dot pulse width = 83%) |
| r81 | 00 | 13 | 19 | 1e | 24 | 2a | 30 | 36 | 3d | 45 | 4f | 5b | 6c | 80 | 9b | cc | (full dot pulse width = 80%) |
| r82 | 00 | 13 | 18 | 1e | 24 | 2a | 30 | 36 | 3d | 44 | 4e | 5a | 6a | 7d | 96 | c4 | (full dot pulse width = 77%) |
| r83 | 00 | 13 | 18 | 1e | 24 | 29 | 2f | 35 | 3c | 43 | 4c | 58 | 67 | 79 | 90 | bb | (full dot pulse width = 73%) |
| r84 | 00 | 13 | 18 | 1e | 23 | 29 | 2f | 35 | 3b | 43 | 4b | 56 | 64 | 75 | 8b | b3 | (full dot pulse width = 70%) |
| r85 | 00 | 13 | 18 | 1e | 23 | 29 | 2e | 34 | 3a | 41 | 4a | 54 | 61 | 71 | 85 | aa | (full dot pulse width = 67%) |
| r86 | 00 | 12 | 18 | 1d | 23 | 28 | 2e | 34 | 3a | 41 | 49 | 53 | 5f | 6e | 80 | a2 | (full dot pulse width = 63%) |

-continued

| row no. | 0 | 1 | 2 | 3 | 4 | 5 | 6 | 7 | 8 | 9 | A | B | C | D | E | F | (column no., hexadecimal) |
|---|---|---|---|---|---|---|---|---|---|---|---|---|---|---|---|---|---|
| r87 | 00 | 12 | 18 | 1d | 22 | 28 | 2d | 33 | 39 | 40 | 47 | 50 | 5c | 69 | 7b | 99 | (full dot pulse width = 60%) highlight family #7 |
| r88 | 00 | 15 | 1c | 22 | 29 | 2f | 36 | 3d | 45 | 4f | 5a | 6a | 7f | 9a | bd | ff | (full dot pulse width = 100%) |
| r89 | 00 | 15 | 1c | 22 | 29 | 2f | 36 | 3d | 45 | 4e | 5a | 69 | 7d | 97 | b8 | f7 | (full dot pulse width = 97%) |
| r90 | 00 | 15 | 1c | 22 | 28 | 2f | 35 | 3c | 44 | 4d | 58 | 67 | 7a | 92 | b3 | ee | (full dot pulse width = 93%) |
| r91 | 00 | 15 | 1c | 22 | 28 | 2e | 35 | 3c | 43 | 4c | 57 | 65 | 78 | 8f | ae | e6 | (full dot pulse width = 90%) |
| r92 | 00 | 15 | 1b | 22 | 28 | 2e | 34 | 3b | 42 | 4b | 55 | 63 | 75 | 8b | a8 | dd | (full dot pulse width = 87%) |
| r93 | 00 | 15 | 1b | 21 | 28 | 2e | 34 | 3b | 42 | 4a | 55 | 61 | 73 | 87 | a3 | d5 | (full dot pulse width = 83%) |
| r94 | 00 | 15 | 1b | 21 | 27 | 2d | 34 | 3a | 41 | 49 | 53 | 5f | 70 | 83 | 9d | cc | (full dot pulse width = 80%) |
| r95 | 00 | 15 | 1b | 21 | 27 | 2d | 33 | 3a | 41 | 49 | 52 | 5e | 6d | 80 | 98 | c4 | (full dot pulse width = 77%) |
| r96 | 00 | 15 | 1b | 21 | 27 | 2d | 33 | 39 | 40 | 47 | 50 | 5c | 6a | 7c | 92 | bb | (full dot pulse width = 73%) |
| r97 | 00 | 15 | 1b | 21 | 26 | 2c | 32 | 39 | 3f | 47 | 50 | 5a | 68 | 78 | 8d | b3 | (full dot pulse width = 70%) |
| r98 | 00 | 15 | 1b | 20 | 26 | 2c | 32 | 38 | 3e | 46 | 4e | 58 | 65 | 74 | 87 | aa | (full dot pulse width = 67%) |
| r99 | 00 | 15 | 1a | 20 | 26 | 2c | 32 | 38 | 3e | 45 | 4d | 57 | 63 | 71 | 83 | a2 | (full dot pulse width = 63%) |
| r100 | 00 | 15 | 1a | 20 | 26 | 2b | 31 | 37 | 3d | 44 | 4b | 55 | 60 | 6d | 7d | 99 | (full dot pulse width = 60%) highlight family #8 |
| r101 | 00 | 18 | 1e | 25 | 2c | 33 | 3a | 41 | 49 | 53 | 5f | 6e | 83 | 9d | bf | ff | (full dot pulse width = 100%) |
| r102 | 00 | 18 | 1e | 25 | 2c | 32 | 39 | 41 | 49 | 52 | 5e | 6d | 81 | 9a | bb | f7 | (full dot pulse width = 97%) |
| r103 | 00 | 18 | 1e | 25 | 2b | 32 | 39 | 40 | 48 | 51 | 5c | 6b | 7e | 95 | b5 | ee | (full dot pulse width = 93%) |
| r104 | 00 | 18 | 1e | 25 | 2b | 32 | 39 | 40 | 47 | 50 | 5b | 69 | 7c | 92 | b0 | e6 | (full dot pulse width = 90%) |
| r105 | 00 | 17 | 1e | 24 | 2b | 31 | 38 | 3f | 47 | 4f | 5a | 67 | 79 | 8e | aa | dd | (full dot pulse width = 87%) |
| r106 | 00 | 17 | 1e | 24 | 2b | 31 | 38 | 3f | 46 | 4f | 59 | 66 | 76 | 8b | a5 | d5 | (full dot pulse width = 83%) |
| r107 | 00 | 17 | 1e | 24 | 2a | 31 | 37 | 3e | 45 | 4d | 57 | 63 | 73 | 86 | 9f | cc | (full dot pulse width = 80%) |
| r108 | 00 | 17 | 1e | 24 | 2a | 30 | 37 | 3e | 45 | 4d | 56 | 62 | 71 | 83 | 9a | c4 | (full dot pulse width = 77%) |
| r109 | 00 | 17 | 1d | 24 | 2a | 30 | 36 | 3d | 44 | 4c | 55 | 60 | 6e | 7f | 94 | bb | (full dot pulse width = 73%) |
| r110 | 00 | 17 | 1d | 23 | 2a | 30 | 36 | 3d | 43 | 4b | 54 | 5e | 6c | 7b | 8f | b3 | (full dot pulse width = 70%) |
| r111 | 00 | 17 | 1d | 23 | 29 | 2f | 35 | 3c | 42 | 4a | 52 | 5c | 69 | 77 | 8a | aa | (full dot pulse width = 67%) |
| r112 | 00 | 17 | 1d | 23 | 29 | 2f | 35 | 3b | 42 | 49 | 51 | 5b | 66 | 74 | 85 | a2 | (full dot pulse width = 63%) |
| r113 | 00 | 17 | 1d | 23 | 29 | 2f | 35 | 3b | 41 | 48 | 50 | 59 | 63 | 70 | 7f | 99 | (full dot pulse width = 60%) highlight family #9 |
| r114 | 00 | 1a | 21 | 28 | 2f | 36 | 3d | 45 | 4d | 57 | 63 | 72 | 87 | a0 | c2 | ff | (full dot pulse width = 100%) |
| r115 | 00 | 1a | 21 | 28 | 2f | 36 | 3d | 45 | 4d | 56 | 62 | 71 | 85 | 9d | bd | f7 | (full dot pulse width = 97%) |
| r116 | 00 | 1a | 21 | 28 | 2e | 35 | 3c | 44 | 4c | 55 | 60 | 6f | 82 | 99 | b7 | ee | (full dot pulse width = 93%) |
| r117 | 00 | 1a | 21 | 27 | 2e | 35 | 3c | 43 | 4b | 55 | 5f | 6d | 7f | 95 | b2 | e6 | (full dot pulse width = 90%) |
| r118 | 00 | 1a | 20 | 27 | 2e | 35 | 3c | 43 | 4b | 53 | 53 | 6b | 7c | 91 | ac | dd | (full dot pulse width = 87%) |
| r119 | 00 | 1a | 20 | 27 | 2e | 34 | 3b | 42 | 4a | 53 | 5d | 6a | 7a | 8e | a7 | d5 | (full dot pulse width = 83%) |
| r120 | 00 | 1a | 20 | 27 | 2d | 34 | 3b | 42 | 49 | 52 | 5b | 67 | 77 | 89 | a1 | cc | (full dot pulse width = 80%) |
| r121 | 00 | 1a | 20 | 27 | 2d | 34 | 3a | 41 | 49 | 51 | 5a | 66 | 75 | 86 | 9c | c4 | (full dot pulse width = 77%) |
| r122 | 00 | 19 | 20 | 26 | 2d | 33 | 3a | 41 | 48 | 50 | 59 | 64 | 72 | 82 | 96 | bb | (full dot pulse width = 73%) |
| r123 | 00 | 19 | 20 | 26 | 2d | 33 | 3a | 40 | 47 | 4f | 58 | 62 | 6f | 7f | 92 | b3 | (full dot pulse width = 70%) |
| r124 | 00 | 19 | 20 | 26 | 2c | 33 | 39 | 40 | 46 | 4e | 56 | 60 | 6c | 7a | 8c | aa | (full dot pulse width = 67%) |
| r125 | 00 | 19 | 20 | 26 | 2c | 32 | 39 | 3f | 46 | 4d | 55 | 5f | 6a | 77 | 87 | a2 | (full dot pulse width = 63%) |
| r126 | 00 | 19 | 1f | 26 | 2c | 32 | 38 | 3f | 45 | 4c | 54 | 5d | 67 | 73 | 81 | 99 | (full dot pulse width = 60%) |
| r127 | 00 | 10 | 20 | 30 | 40 | 50 | 60 | 70 | 80 | 90 | a0 | b0 | c0 | d0 | e0 | ff | linear steps |

The image processor 15 controls which of the highlight families #1–#9 on the lookup table 27 are addressed when data is transmitted from the YMGK memory stores 21–24. In the preferred embodiment, the image processor 15 uses a profile select lookup table that is part of the image processor 15 in selecting the highlight families #1–#9. The image processor 15 determines which of the highlight families #1–#9 should be used as compensation profiles, and receives signals from a relative humidity indicator 45 and from developer page counters 51–54 indicating developer life and associated with each of four developers 55–58. These signals are combined with a signal representing the YMCK color being developed during the cycle. In addition, the image processor 15 receives signals from a store 47 containing a manufacturer's sensitivity value number for an optical photoreceptor (OPR) 48. In selecting the highlight family, relative humidity, developer image count and the color are used to select a value, preferably by reference to the profile select lookup table. This value is then offset from the value provided by the profile select lookup table in response to the manufacturer's sensitivity value number from the store 47.

The signals provided to the image processor from the relative humidity indicator 45, store 47, and developer page counters 51–54 are external modification signals. The designation, "external" means that the signals are external to the datapath of data from the bit mapped image is scanned into an image processor 15 and transmitted to the laser diode driver circuit 31 for illuminating the laser diode 33.

The signals from the developer page counters 51–54 provide an indication of developer life. In the preferred embodiment, the developer page counters obtain the indication of developer life by measuring a number of cycles that each of the four developers 55–58 was used. This is an approximation, and it is also possible to use another means of counting developer life, such as electrical ON time if available or a measurement of toner quantity. If the printer 11 is operated without using all developers 55–58, only the cognizant page counters increment. Separate page counters are required, at least for the black developer 58, because it is common to operate the printer 11 in a monochrome mode. The page counters 51–54 are configured to reset when their respective developers 55–58 are replaced.

The profile table within the selected highlight family #1–#9 is referenced to apply a value for each pixel, generating a compensated pulse width value (grayscale). The values are then used by the pulse width modulation (PWM) circuit 29 to generate the required PWM signal. The highlight families #1–#9 match values adjusted in accordance with the external modification signals. The image processor 15 responds to the external modification signals from indicator 45, store 47, and page counters 51–54 to select the block corresponding to one of highlight families #1–#9. Each of the external modification signals from indicator 45, store 47, and page counters 51–54 relate to the ability of the OPR 48 to attract toner. While the factors represented by the external modification signals affect different aspects of the imaging process, it is possible to use a combination of these external modification signals to adjust the pattern in the lookup table 27. The selection of the highlight families #1–#9 is made in response to the external modification signals in order to adjust halftone response. This can best be seen from the values in columns 1–4, which vary from highlight family to highlight family.

As indicated, each of the highlight families #1–#9 includes thirteen rows. The row is selected according to desired energy to be applied for a full tone dots. This can best be seen from the values in column $f$ ($15_{10}$), which vary from $ff_{16}$ to $99_{16}$ ($255_{10}$ to $153_{10}$ in decimal notation) in each of highlight families #1–#9. The full tone dot values do not change from highlight family to highlight family. The values of column $f$ therefore repeat.

The bytes in each row include values that are supplied to the PWM circuit 29 to control PWM output. Each row r0–r127 corresponds to a desired pattern of PWM outputs. Image data from the respective YMCK memory stores 21–24 are provided as four bits per pixel, and is used to select which of the sixteen bytes in the row are provided to the PWM circuit 29.

Figure 1A:
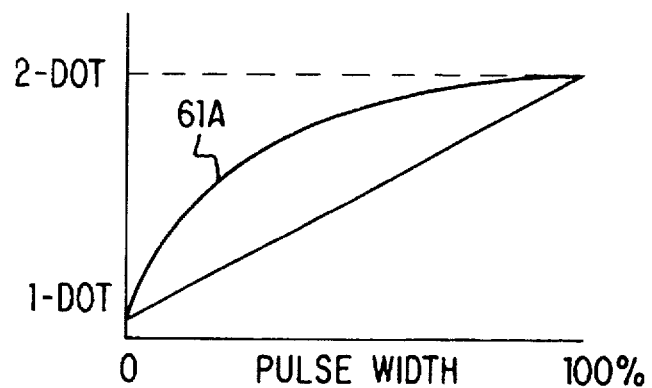
FIGS. 1A and 1B graphically show dot size plotted in terms of pulse width (abscissa) as it affects line width response and tone response (ordinate).
Figure 1B:
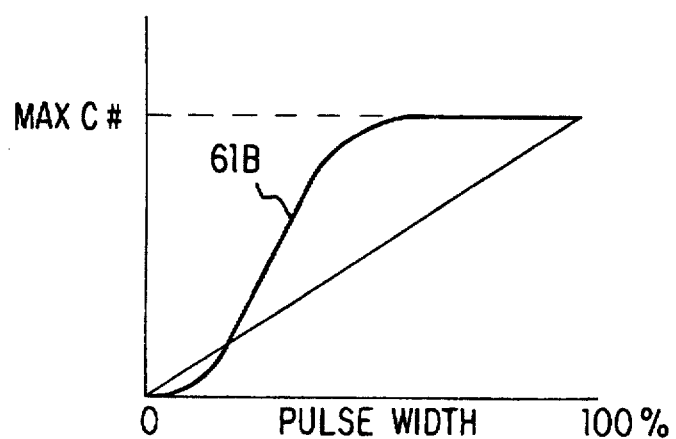
Figure 4:
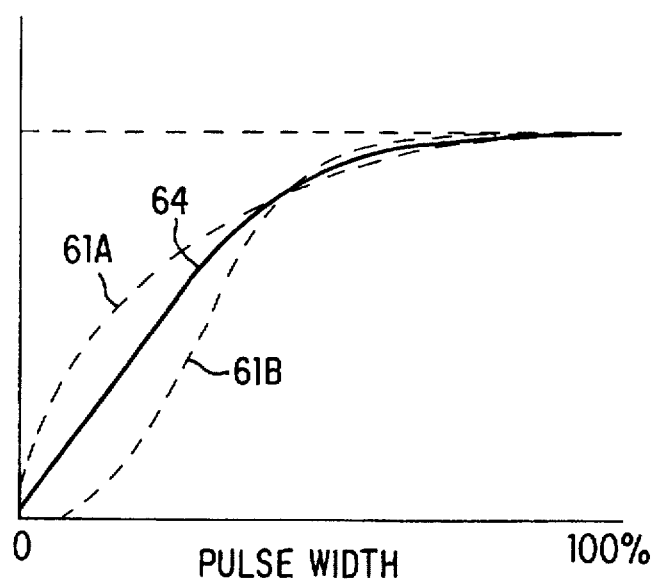
FIG. 4 graphically shows the responses of FIGS. 1 (solid lines), and a compromise value (dotted line).

FIG. 4 shows in dotted lines, the values 61A and 61B of the ideal values of FIGS. 1A and 1B. The desired pattern provided as an output from the lookup table 27 to the PWM circuit 29 represents a compromise between the ideal values 61A, 62B, and is represented by a dotted line 64 on FIG. 4. Since rows r10–r126 are within the highlight families #1–#9, the selection is of one of those rows in normal operation, with the zero row r0 used for startup.

By the use of the highlight families #1–#9 in lookup table 27, it is possible to adjust the output from a bit map to adjust pulse width modulation with high precision. The division of lookup table 27 into blocks corresponding to the highlight families #1–#9 makes it possible to adjust the output from a bit map in accordance with the external modification signals from indicator 45, store 47, and page counters 51–54. This makes it possible to adjust the output of the PWM circuit 29 in order to achieve the desired curve under a selected range of conditions.

The outputs from the color image memory stores 21–24 are provided at 4 bits per pixel. The lookup table 27 provides an output of 8 bits per pixel, so that the selection of the row r10–r126 provides an output that has a precision corresponding to the 8 bits per pixel provided by the lookup table 27.

The printing of multiple colors is accomplished by sequentially and separately developing each of the four YMCK primary colors. In the preferred embodiment, a full sheet of yellow is developed, and then full sheets of magenta, cyan, and black, respectively. In the assignee's HP Color LaserJet™ and the present embodiment, the developed images are superimposed on the OPR 48 prior to transfer to print media, although there are other ways to accomplish image transfer. The technique of sequentially and separately developing each of the four primary YMCK colors allows the image processor 15 to separately address the selection of the rows r10–r126 within the blocks corresponding to highlight families #1–#9.

While the external factors measured in the preferred embodiment are obtained from a relative humidity indicator 45, a manufacturer's sensitivity value number, and developer page counters 51–54, it is possible to obtain different information for the purpose of modifying the output of the PWM circuit 29. It is also possible to use the inventive techniques on other electronic equipment that provide pixelated images. While particularly useful for laser dot matrix electrophotographic printers, the inventive techniques can be used with scan patterns other than dot matrix, and for other types of dot matrix printers. In particular, the invention is useful for laser dot matrix printers that are capable of developing halftone images by reducing development for individual pixels. It is also possible to use the inventive techniques to produce images that use additive colors, such as CRT based equipment used for producing print offset masters. It is therefore anticipated that the invention should be limited in scope only by the claims.

What is claimed is:

1. A circuit for improving the image quality of an electronic raster scan, the circuit comprising:
   a. an image generator circuit for pixelating the image by resolving the image into a pattern of pixels for development and providing an output signal corresponding to the pattern of pixels;
   b. a drive circuit for driving an image scan device in a scan pattern, the scan pattern corresponding to the pattern of pixels provided by the output signal;
   c. a modification circuit, including a lookup table for receiving the output signal from the image generator circuit, modifying the output signal and transmitting the modified signal to the drive circuit, thereby providing an adjustment in an image directed to the target in accordance with values stored in the lookup table, said lookup table providing pulse width modulation (PWM) data for a linear tone response with a maximum number of usable tone levels, and further modifying the output signal to compensate for external factors including developer life, as represented by cycle count, relative humidity and a photosensitivity value of the particular optical photoreceptor (OPR) as provided by the manufacturer;
   d. said image generator circuit providing said image to said drive circuit in page images, each page image corresponding to a bit map and each page image constituting a cycle of image generation, said modification circuit transmitting the modified signal to the drive circuit in corresponding cycles, the use of the page images allowing information for each page to be placed in a memory having a size corresponding to a given image plane; and
   e. said modification circuit responding to said sensor prior to said modification circuit transmitting the modified signal to the drive circuit in each of said corresponding cycles.

2. The circuit of claim 1, further comprising:
   a. at least one sensor detecting a variable consisting of one of relative humidity, operational life of a developer or response level of a photoreceptor;
   b. said sensor providing said variable to the modification circuit; and
   c. said modification circuit responding to said variable by effecting an adjustment in said output signal.

3. The circuit of claim 1, further comprising:
a. said lookup table arranged in a plurality of series of values, which when said values provided as said modified signal; and
b. said modified signal producing an image development pattern that approximates a predetermined response pattern for image generation as a function of output from the image scan device, in accordance with values stored in the lookup table.

4. The circuit of claim 1, further comprising:
said modification circuit receiving the output signal from the image generator circuit at a first bit resolution and transmitting the modified signal to the drive circuit at a second, higher bit resolution by selecting the values stored in the lookup table.

5. The circuit of claim 1, further comprising:
a. said drive circuit providing a pulse width modulated output to the image scan device; and
b. said modified signal including pulse width modulation values used to control said pulse width modulated output.

6. The circuit of claim 1, further comprising:
a. said drive circuit providing a pulse width modulated output to the image scan device;
b. said lookup table arranged in a plurality of series of values, which when said values provided as said modified signal; and
c. said modified signal producing an image development pattern that approximates a predetermined response pattern for image generation as a function of output from the image scan device, thereby providing, according to said predetermined response pattern, an adjustment in pulse width modulation of said image directed to the target.

7. A circuit for increasing the image quality of an electronic scan in which plural colors chosen as primary colors provide a color image, the circuit comprising:
a. an image generator circuit for generating a pattern of the image by resolving the image into a pattern for development for each of said primary colors and providing an output signal corresponding to the pattern;
b. a drive circuit for driving an image scan device in a scan pattern, the scan pattern corresponding to the pattern provided by the output signal, said image generator circuit providing said image to said drive circuit in page images each page image corresponding to a bit map and each page image constituting a cycle of image generation; and
c. a modification circuit, including a lookup table for receiving the output signal from the image generator circuit, modifying the output signal for at least one of said primary colors and transmitting the modified signal to the drive circuit, said modification circuit receiving the output signal from the image generator circuit at a first bit resolution and transmitting the modified signal to the drive circuit at a second, higher bit resolution by selecting the values stored in the lookup table, and further modifying the output signal to compensate for external factors including developer life, as represented by cycle count, relative humidity and a photosensitivity value of the particular optical photoreceptor (OPR) as provided by the manufacturer, said modification circuit transmitting the modified signal to the drive circuit in corresponding cycles, the modification circuit improving resolution, providing more precise color imaging and better control of optical density.

8. The circuit of claim 7, further comprising:
a. at least one sensor detecting a variable consisting of one of relative humidity, operational life of a developer or response level of a photoreceptor;
b. said sensor providing said variable to the modification circuit; and
c. said modification circuit responding to said variable by effecting an adjustment in said output signal.

9. The circuit of claims further comprising:
a. said image generator circuit providing said image, corresponding to said patterns for development for each of said primary colors, constituting a cycle of image generation, said modification circuit transmitting the modified signal to the drive circuit in corresponding cycles; and
b. said modification circuit responding to said sensor prior to said modification circuit transmitting the modified signal to the drive circuit in each of said corresponding cycles.

10. The circuit of claim 7, further comprising:
a. said lookup table arranged in a plurality of series of values, which when said values provided as said modified signal; and
b. said modified signal producing an image development pattern that approximates a predetermined response pattern for image generation as a function of output from the image scan device, in accordance with values stored in the lookup table.

11. The circuit of claim 7, further comprising:
a. said drive circuit providing a pulse width modulated output to the image scan device; and
b. said modified signal including pulse width modulation values used to control said pulse width modulated output.

12. The circuit of claim 7, further comprising:
a. said drive circuit providing a pulse width modulated output to the image scan device;
b. said lookup table arranged in a plurality of series of values, which when said values provided as said modified signal; and
c. said modified signal producing an image development pattern that approximates a predetermined response pattern for image generation as a function of output from the image scan device, thereby providing, according to said predetermined response pattern, an adjustment in pulse width modulation of said image directed to the target, the use of the page images allowing information for each page to be placed in a memory having a size corresponding to a given image plane.

13. Method for controlling an image generated by an electronic scan comprising:
a. resolving the image into a pattern of pixels and providing an output signal;
b. using a drive circuit for driving an image scan device in a scan pattern, the scan pattern corresponding to the pattern of pixels;
c. using a lookup table for receiving the output signal, modifying the output signal in accordance with values in the lookup table, and transmitting the modified signal to the drive circuit, thereby providing an adjustment in an image directed to the target in accordance with values stored in the lookup table, said lookup table providing pulse width modulation (PWM) data for a linear tone response with a maximum number of usable tone levels and further modifying the output signal to compensate for external factors including developer life, as represented by cycle count, relative humidity and a photosensitivity value of the particular optical photoreceptor (OPR) as provided by the manufacturer;

d. providing said image to said drive circuit in page images, each page image corresponding to a bit map and each page image constituting a cycle of image generation, said modifying of the output signal to the drive circuit in cycles corresponding to the scan pattern, allowing information for sequential pages to be placed in a memory having a size corresponding to a given image plane; and e. transmitting the modified signal to the drive circuit in each of said corresponding cycles.

14. The method of claim 13, further comprising:

a. resolving the image into a pattern for development for each of a plurality of a plurality of colors chosen as primary colors and providing said output signal as a plurality of image overlays; and a. for each of the image overlays, receiving the output signal at a first bit resolution and transmitting the modified signal to the drive circuit at a second, higher bit resolution by selecting the values stored in the lookup table, thereby providing an adjustment in a composite image in accordance with values stored in the lookup table.

15. The method of claim 13, further comprising:

a. detecting a variable consisting of one of relative humidity, operational life of a developer or response level of a photoreceptor; and b. responding to said variable by selection of sets of values in said lookup table and using said sets of values for modifying the output signal.

* * * * *